US006565950B1

(12) United States Patent
Tomioka et al.

(10) Patent No.: US 6,565,950 B1
(45) Date of Patent: May 20, 2003

(54) RECORDING MEDIUM, IMAGE FORMING METHOD UTILIZING THE SAME, METHOD FOR PRODUCING THE SAME, ALUMINA DISPERSION AND METHOD FOR PRODUCING THE SAME

(75) Inventors: Hiroshi Tomioka, Tokyo (JP); Tsuyoshi Santo, Yokohama (JP); Yuji Kondo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,972

(22) Filed: Jun. 16, 1999

(30) Foreign Application Priority Data

Jun. 18, 1998 (JP) .......................... 10-171288
Jun. 18, 1998 (JP) .......................... 10-171290

(51) Int. Cl.$^7$ ............................... B41M 5/00
(52) U.S. Cl. ........................ 428/195; 347/105
(58) Field of Search .................. 428/195, 328, 428/329; 347/105

(56) References Cited

U.S. PATENT DOCUMENTS

| 2,656,321 A | 10/1953 | Hunter et al. ............... 252/313 |
| 4,202,870 A | 5/1980 | Weber et al. ............... 423/630 |
| 4,242,271 A | 12/1980 | Weber et al. ......... 260/448 AD |
| 4,732,786 A | 3/1988 | Patterson et al. ........... 427/261 |
| 4,879,166 A | 11/1989 | Misuda et al. .............. 428/212 |
| 5,104,730 A | 4/1992 | Misuda et al. ........... 428/304.4 |
| 5,203,916 A * | 4/1993 | Green et al. ................ 106/438 |
| 5,965,252 A | 10/1999 | Santo et al. ................ 428/329 |

FOREIGN PATENT DOCUMENTS

| EP | 0 636 489 A1 | 2/1995 |
| EP | 0 749 845 A1 | 12/1996 |
| JP | 54-59936 | 5/1979 |
| JP | 54-116398 | 9/1979 |
| JP | 55-5830 | 1/1980 |
| JP | 55-23034 | 2/1980 |
| JP | 55-27824 | 2/1980 |
| JP | 55-51583 | 4/1980 |
| JP | 57-88074 | 6/1982 |
| JP | 61-283335 | 12/1986 |
| JP | 62-56321 | 3/1987 |
| JP | 1-171633 | 7/1989 |
| JP | 2-276670 | 11/1990 |
| JP | 3-215082 | 9/1991 |
| JP | 3-281383 | 12/1991 |
| JP | 4-7189 | 1/1992 |
| JP | 4-275917 | 10/1992 |
| JP | 5-16015 | 3/1993 |
| JP | 5-85033 | 4/1993 |
| JP | 5-85034 | 4/1993 |
| JP | 5-85085 | 4/1993 |
| JP | 6-32046 | 2/1994 |
| JP | 6-64918 | 3/1994 |
| JP | 6-64919 | 3/1994 |
| JP | 7-10535 | 1/1995 |
| JP | 7-267633 | 10/1995 |
| JP | 8-132731 | 5/1996 |
| JP | 8-295509 | 11/1996 |
| JP | 9-76628 | 3/1997 |
| JP | 9-86035 | 3/1997 |

OTHER PUBLICATIONS

Patent Abstracts of Japan, vol. 018, No. 243 (M–1602) May 10, 1994, relating to JP 6–32046 of Feb. 8, 1994.
Patent Abstracts of Japan, vol. 016, No. 153 (M–1235) Apr. 15, 1992, relating to JP 4–7189 of Jan. 10, 1992.
Josef Roček, et al., "Porous Structure of Aluminium Hydroxide and Its Content of Pseudobehmite", Applied Catalysis, vol. 74, No. 1, Jun. 27, 1991, pp. 29–36.
Bulent E. Yoldas, "Alumina Sol Preparation from Alkoxides", American Ceramic Society Bulletin, vol. 54, No. 3, Mar., 1975, pp. 289–290.
Elliot P. Barrett, et al., "The Determination of Pore Volume and Area Distributions in Porous Substances. I. Computations from Nitrogen Isotherms", J. Am. Chem. Soc., vol. 73, Jan., 1951, pp. 373–380.
Stephen Brunauer, et al., "Adsorption of Gases in Multimolecular Layers", J. Am. Chem. Soc., vol. 60, Feb., 1938, pp. 309–319.

* cited by examiner

*Primary Examiner*—Bruce H. Hess
(74) *Attorney, Agent, or Firm*—Fitzpatrick, Cella, Harper & Scinto

(57) ABSTRACT

Provided is a recording medium provided with an ink receiving layer on a substrate, wherein said ink receiving layer comprises an alumina hydrate having a boehmite structure and a non-coupling zirconium compound.

18 Claims, No Drawings

RECORDING MEDIUM, IMAGE FORMING METHOD UTILIZING THE SAME, METHOD FOR PRODUCING THE SAME, ALUMINA DISPERSION AND METHOD FOR PRODUCING THE SAME

BACKGROUND OF THE INVENTION

1. Field of the Invention

The present invention relates to a recording medium suitable for ink-jet recording and in particular for output of a photographic image, a method for producing the recording medium, an image forming method utilizing the recording medium, an alumina dispersion and a method for producing the alumina dispersion.

The ink-jet recording system comprising ejecting minute ink droplets by various principles and depositing such the ink droplets onto a recording medium, such as paper to conduct recording an image or a character, is becoming rapidly popular in recent years in various applications in recording various images including the information processing equipment, because of features such as a high speed, a low noise level, ease of multi color image formation, flexibility in the recorded pattern, absence of necessity for image development or fixation etc. Also, the image formed by the multi-color ink-jet recording system is comparable in image quality to the multi-color printing with printing plates or the print by color photography, and is being widely used in the field of full-color image recording as it is less expensive than the ordinary multi-color printing or photographic printing when the number of prints is low.

2. Related Background Art

In the ink-jet recording system, the recording apparatus and method have been improved along with the improvement in the recording characteristics such as increase in the recording speed and in the image definition and transition toward full-color recording, but requirements of a higher level are being requested also for the recording medium. For meeting such requirements, there have been proposed recording media of various forms. For example, Japanese Patent Application Laid-Open No. 55-5830 discloses an ink-jet recording paper provided with an ink absorbing coated layer on a substrate, and Japanese Patent Application Laid-Open No. 55-51583 discloses a configuration employing amorphous silica as the pigment in the coated layer.

U.S. Pat. Nos. 4,879,166 and 5,104,730, Japanese Patent Application Laid-Open Nos. 2-276670, 3-215082 and 3-281383 and a patent application of the present inventors have proposed a recording sheet having an ink receiving layer employing alumina hydrate having a pseudo boehmite structure.

Also, the recording media employing zirconium compound are being increasingly proposed in recent years. For example, Japanese Patent Application Laid-Open No. 4-7189 discloses a method for producing a recording medium provided with an ink receiving layer containing porous pigment and zirconium compound. Also, Japanese Patent Application Laid-Open Nos. 5-85033, 5-85034 and 5-85085 have proposed a recording medium having an intermediate layer between the ink receiving layer and the substrate, and disclosed an example of employing a zirconium-containing crosslinking agent in the intermediate layer. Also, Japanese Patent Application Laid-Open No. 6-32046 proposes a recording medium provided with an ink receiving layer containing specified amounts of amorphous silica, a vinyl alcohol copolymer containing silanol radicals and a zirconium compound. Furthermore, U.S. Pat. No. 4,732,786 discloses a recording medium provided with an ink receiving layer containing specified amounts of a pigment, a binder, an insolubilized hydrophilic polymer and a zirconium compound as polyvalent cation.

However, the recording media mentioned above can improve the coating strength, but they are still insufficient in the ink absorbing ability, resolution or gradation sufficient for reproducing the image quality comparable to that of the silver halide-based photography, and are deficient in a water fastness and an image preservability.

Also, Japanese Patent Application Laid-Open No. 9-76628 discloses a recording medium provided with an ink receiving layer containing an alumina hydrate subjected to surface treatment with a zirconium-containing coupling agent. However, further improvement in the performance is desired even for such recording medium, for use on the recent photo ink-jet printer that can output a high-quality image comparable to that of the silver halide-based photography.

The photo ink-jet printer produces the density gradation by superposing a low concentration ink or inks having different concentrations in order to obtain smooth gradation which is important in producing a photographic image. For this reason, the amount of ink deposited per unit area is significantly larger than that in the conventional ink-jet printer. On the other hand, in order to enhance a permeability of ink for enabling image output on plain paper, there is added a large amount of surfactant in the ink solvent or there is employed a highly hydrophilic dye. For this reason, even with the use of alumina hydrate having a high dyeing ability, the ink tends to bleed in an area of a high ink deposition amount, thus deteriorating the resolution of the image or causing migration of the dye after the image recording.

On the other hand, there have been known various methods for producing an alumina hydrate dispersion. For example, Japanese Patent Application Laid-Open Nos. 54-116398, 55-23034 and 55-27824 disclose a method for preparing alumina hydrate gel by reacting a basic aluminum salt with an alkali or an acid or reacting an acidic aluminum salt with an alkali and deflocculating the obtained gel to form an alumina hydrate dispersion. Also, a method of hydrolyzing aluminum alkoxide to prepare alumina hydrate and deflocculating it with an acid to obtain alumina hydrate dispersion is proposed, for example, in Japanese Patent Application Laid-Open Nos. 57-88074, 62-56321, 4-275917, 6-64918, 7-10535, 7-267633, U.S. Pat. No. 2,656,321 and Am. Ceramic Soc. Bull., 54, p. 289 (1975).

However, for obtaining an alumina hydrate dispersion with a deflocculant such as acid, it is necessary to add a large amount of deflocculant as described in Japanese Patent Application Laid-Open No. 62-56321. If the amount of deflocculant is too little, there will be required a longer time for deflocculation or there will result insufficient deflocculation. Japanese Patent Application Laid-Open No. 7-10535 discloses a method of executing deflocculation at a high temperature and under pressure in order to reduce the amount of the deflocculant and the time required for deflocculation, but such deflocculation at high temperature and under pressure requires a pressurized reactor. Also the use of acid at high temperature and under pressure results in various limitations in manufacture such as a reduced service life of the reactor.

Furthermore, Japanese Patent Application Laid-Open No. 6-064919 discloses a method of adding an acid to alumina hydrate and applying an ultrasonic treatment to obtain a sol, but such method not only requires a special facility, thus involving limitations in the manufacture, but also results in difficulty in deflocculation and dispersion and in a short pot life at a high solid concentration.

Also, as described in Japanese Patent Application No. 7-10535, a gel tends to be produced at a high solid concentration in case a large amount of acid is used for deflocculation, so that an alumina hydrate dispersion of a high concentration has been extremely difficult to obtain.

The alumina sol of a high concentration and a low viscosity has been proposed in various forms such as a form containing a water-soluble aliphatic amino acid or a lactam derived therefrom (refer to Japanese Patent Application Laid-Open No. 61-283335), a form containing an acid amide (refer to Japanese Patent Application Laid-Open No. 1-171633), or a form with a defined content of cations other than a hydrogen ion (refer to Japanese Patent Application Laid-Open No. 8-295509). However, even the dispersion of such forms shows insufficient stability when a water-soluble or water-dispersible polymer is mixed for obtaining a binding property or a shaping property for the purpose of forming a coating material, paint, bulk ceramics or catalyst carrier, and there cannot be obtained a sufficiently low viscosity or a sufficiently long pot life.

SUMMARY OF THE INVENTION

In consideration of the foregoing, an object of the present invention is to provide a recording medium allowing a wide selection of inks, showing little ink migration or bleeding, a high optical density in the printed area, satisfactory transparency and showing excellent halftone reproduction particularly in the output of a photographic image, and an image forming method utilizing such the recording medium.

Another object of the present invention is to provide a method for producing the recording medium, with coating dispersion of excellent stability with a high pH and with little corrosion, and without requiring a special manufacturing facility.

Still another object of the present invention is to provide an alumina dispersion showing an excellent binding property and shaping property, and having a high solid concentration, a low viscosity, excellent stability of dispersion and a long pot life.

Still another object of the present invention is to provide a method for producing the alumina dispersion of the above-mentioned properties, in an easy manner without any special manufacturing facility.

The above-mentioned objects can be attained according to the present invention in the following manner.

According to the present invention there is provided a recording medium provided with an ink receiving layer formed on a substrate, wherein the ink receiving layer comprises an alumina hydrate having a boehmite structure and a non-coupling zirconium compound.

According to the present invention there is also provided a method for producing a recording medium by forming an ink receiving layer on a substrate, which comprises applying and drying, on the substrate, a dispersion comprising an alumina hydrate having a boehmite structure, a non-coupling zirconium compound and a binder, thereby forming the ink receiving layer.

According to the present invention there is further provided an image forming method by ejecting an ink from a minute orifice and depositing it on a recording medium to form an image, wherein the recording medium is any one of the aforementioned recording medium.

According to the present invention there is still provided an alumina dispersion comprising an alumina hydrate, a binder, and an inorganic salt and/or an organic acid salt of zirconium.

According to the present invention there is also still provided a method for producing an alumina dispersion which comprises mixing and dispersing a binder into a dispersion comprising an alumina hydrate and an inorganic salt and/or an organic acid salt of zirconium.

DESCRIPTION OF THE PREFERRED EMBODIMENTS

The recording medium of the present invention has a configuration provided, on a substrate, with an ink receiving layer composed principally of an alumina hydrate having a boehmite structure, a non-coupling zirconium compound and preferably a binder.

Alumina hydrate is a preferred material for use in the ink receiving layer since it shows satisfactory fixation of a dye in the ink, provides an image of satisfactory color appearance and is free from drawbacks such as change of black ink into brown color or insufficient light fastness, because of its positive charge.

For use in the recording medium of the present invention, most preferred is an alumina hydrate having a boehmite structure in the X-ray diffraction because of a high dye adsorption, an ink absorption and a transparency.

The alumina hydrate is defined by the following general formula:

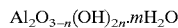

wherein n is an integer of from 0 to 3 and m is a value within a range of from 0 to 10, preferably from 0 to 5, provided that m and n are not zero at the same time. The presentation $mH_2O$ indicates a detachable water phase which is in most cases not involved in the formation of a crystal lattice, and, for this reason, m may assume a non-integral value.

A method for producing an alumina hydrate having a boehmite structure to be contained in the recording medium of the present invention is not particularly limited, and there may be employed any method capable of producing an alumina hydrate, such as Bayer process, a process of alum pyrolysis and the like. A preferred method consists of hydrolyzing long-chain aluminum alkoxyde by the addition of an acid. Use of alkoxyde having 5 or more carbon atoms, particularly having 12 to 22 carbon atoms, is preferred since it facilitates elimination of alcohol and shape control of the alumina hydrate having a boehmite structure as will be explained later. The above-mentioned method has an advantage of low contamination by impurities such as various ions, in comparison with methods for producing an alumina hydrogel or a cationic alumina. Also the long-chain aluminum alkoxyde, allowing easy elimination of alcohol after hydrolysis, provides an advantage that alcohol can be completely eliminated from alumina hydrate, in comparison with the case of employing short-chain alkoxyde such as aluminum isopropoxide.

The alumina hydrate obtained by the above-mentioned method can subjected to grain growth by a hydrothermal synthesis or can provide an alumina hydrate powder by drying.

The crystal of alumina hydrate having a boehmite structure is generally a layered compound showing a large (020) plane, and shows a specific diffraction peak on the X-ray diffraction chart. The boehmite structure can be a complete boehmite structure or a pseudo-boehmite structure containing excess water between (020) planes. In the X-ray diffraction pattern, the pseudo-boehmite structure shows a broader diffraction peak than in the complete boehmite structure. As the complete boehmite structure and the pseudo-boehmite structure cannot be clearly distinguished, an alumina hydrate in the present invention includes both boehmite structures unless specified otherwise.

The recording medium of the present invention, containing an alumina hydrate having a boehmite structure, preferably has a crystallinity within a range of from 15 to 80. Within such range, the medium shows a high optical density in the printed area, and is reduced in bleeding, beading or repelling.

The crystallinity of the recording medium is an amount obtained from a ratio of an intensity at $2\theta=10°$ to a peak intensity of a (020) plane appearing at $2\theta=14$ to $15°$ in the X-ray diffraction pattern with CuK$\alpha$ rays measured for a powdered recording medium, as shown in Japanese Patent Application No. 8-132731 by the present inventors. The crystallinity is a physical quantity corresponding to the ratio of crystalline portions to amorphous portions of a alumina hydrate present in the recording medium.

Also in the present invention, the terms "bleeding" means a phenomenon that a colored area becomes wider (larger) than the printed area, in case of solid printing of a predetermined area. The terms "beading" means a phenomenon that grain-shaped unevenness in density occurs due to coagulation of ink droplets each other appeared in the solid printed area. Also, the terms "repelling" means a phenomenon that uncolored spots occur in the solid printed area.

It is preferred that the degree of parallelization between the microcrystals of an alumina hydrate having a boehmite structure and the plane direction of the ink receiving layer is 1.5 or higher. The degree of parallelization is defined in the crystallinity in the following examples. A degree of parallelization of 1.5 or higher is preferred because the printed dot shows a high circularity. With a degree of parallelization less than 1.5, the circularity of the printed dot becomes deteriorated. A further preferred range is 2 or higher, in which the recording medium shows a higher glossiness.

Among alumina hydrates, the pseudo-boehmite is known to be present in fibrous and other forms, as reported by Rocek J., et al., Applied Catalysis, 74, p. 29–36 (1991). The present invention may employ an alumina hydrate of a fibrous or planar form. The shape (particle shape, particle diameter, aspect ratio) of an alumina hydrate having a boehmite structure can be measured by preparing a specimen by dispersing alumina hydrate in an ion-exchanged water and dropping the dispersion on a collodion film and observing the specimen under a transmission electron microscope.

According to the observation of the present inventors, the planar form shows better dispersibility in water in comparison with fiber bundle (fibrous) form, and is preferred because, in forming the ink receiving layer, the alumina hydrate particles are oriented in random manner to provide a larger pore volume and a broader pore radius distribution. The fiber bundle form means a state in which acicular alumina hydrate particles are gathered with lateral faces of the particles in mutual contact, in a form similar to a hair bundle.

An aspect ratio of the planar particle can be determined by a method defined in Japanese Patent Publication No. 5-16015. The aspect ratio is a ratio of a diameter of the particle to a thickness thereof, wherein the diameter means a diameter of a circle of an area equal to the projected area of the alumina hydrate particle observed under a microscope or an electron microscope. The slenderness ratio is a ratio of maximum and minimum diameters of the planar plane in the observation similar to that for determining the aspect ratio. In case of fibrous bundle form, an aspect ratio can be determined by measuring a diameter of the upper or lower circle and a length of a cylinder constituted by each acicular particle of alumina hydrate constituting the fibrous bundle and calculating the ratio of the length to the diameter.

The most preferred shape of alumina hydrate has, in case of planar form, an average aspect ratio in a range of from 3 to 10 and an average particle size within a range of from 1 to 50 nm, or, in case of fibrous bundle form, an average aspect ratio within a range of from 3 to 10 and an average particle length within a range of from 1 to 50 nm. The average aspect ratio within the above-mentioned range allows to form a pore between the particles in forming the ink receiving layer or in case of internal addition to the fibrous substance, thereby allowing to easily form a porous structure the pore radius distribution of which is shifted broader. Also, the average particle diameter or the average particle length within the above-mentioned range similarly allows to form a porous structure with a large pore volume. In a case that an average aspect ratio is smaller than the lower limit of the above-mentioned range, a pore radius distribution of the ink receiving layer will be shifted narrower, while, if the average aspect ratio is larger than the upper limit of the above-mentioned range, it becomes difficult to produce an alumina hydrate with controlled particle diameter. Also, if the average particle diameter or the average particle length is smaller than the lower limit of the above-mentioned range, the pore radius distribution tends to shift narrower, while, if the average particle diameter or the average particle length is larger than the upper limit of the above-mentioned range, the adsorption property for an applied dye tends to be deteriorated.

A pore property of the alumina hydrate mentioned above is adjusted in the course of preparation, to the adjustment of fine pore property, but, for obtaining the recording medium satisfying the requirements for a BET specific surface area and a pore volume in the ink receiving layer as will be explained later, it is preferable to employ an alumina hydrate with a pore volume within a range of from 0.1 to 1.0 cm$^3$/g. A pore volume larger than the above-mentioned range tends to generate cracks or powder drop-off in the ink receiving layer, while a pore volume smaller than the above-mentioned range reduces ink absorption, bleeding tends to occur in images due to ink overflow from the ink receiving layer, particularly in case of multi-color printing.

Also, the BET specific surface area of an alumina hydrate is preferably within a range of from 40 to 500 m$^2$/g. In a case that a BET specific surface area is small than the above-mentioned range, a glossiness of the ink receiving layer will be decreased and a haze level will be increased so that the printed image tends to become hazy. Also, the surface area larger than the above-mentioned range tends to generate cracks in the ink receiving layer.

The ink receiving layer can be formed on the substrate through steps of applying a dispersion of the alumina hydrate and drying such the dispersion.

The ink receiving layer of the recording medium of the present invention further contains a zirconium compound which does not directly combine with the alumina hydrate having the above-mentioned boehmite structure. The above-mentioned zirconium compound, in combination with the alumina hydrate having a boehmite structure, can exhibit effects high in adsorption for a dye contained in the ink and prevention of bleeding, in the ink receiving layer.

In inks for a recent ink-jet printer, as explained in the foregoing, there is employed a large amount of surfactant or a higher hydrophilic dye in order to increase an ink permeability into plain paper. Because of the high hydrophilicity of the dye, even after the ink is combined with a pigment practically serving as a dye adsorbent, the adsorbed dye may migrate together with the ink components which are later delivered for example in superposed printing or may migrate even by the moisture in the air, so that such the inks tend to cause bleeding, dot gain, migration of dyes, etc. On the other hand, in the recording medium of the present invention employing the combination of the alumina hydrate having a boehmite structure and a non-coupling zirconium compound that does not combine directly with alumina hydrate, the zirconium compound charges the surface of alumina hydrate to increase the cationic character thereof, thus enhancing the adsorbing property for anionic dyes principally employed in the field of an ink-jet system. Consequently, the recording medium of the present invention shows extremely little bleeding in superposed printing or migration even under a high-temperature and high-humidity conditions. In the present invention, the non-coupling zirconium compound means a zirconium compound that is not chemically combined with the alumina hydrate.

The above-mentioned effect is exhibited by a fact that the above-mentioned zirconium compound is ionized at the time of applying an ink to absorb a dye strongly, and is therefore not observed in a compound having a low ionicity that directly combines with the alumina hydrate, such as a zirconium based coupling agent. Incidentally, a bonding state between the alumina hydrate and the zirconium compound can be examined by the chemical shift in the X-ray photoelectronic spectroscopy (XPS or ESCA, hereinafter collectively represented as "ESCA").

The terms "migration" referred to in the present invention means diffusion and displacement of the dye with the lapse of time in the ink receiving layer, resulting in gradual blurring and bleeding of the recorded image.

It has also been found out in the present invention that a halftone reproducibility can be improved by the combined use of the alumina hydrate having a boehmite structure and the non-coupling zirconium compound. Fine halftone reproduction is an important requirement in the output of the photographic image. However, in the image forming method of representing the density gradation by superposed printing with a low-concentration ink or inks having different concentrations, principally employed in the recent photographic ink-jet printers, the hue tends to vary because of the difference in hue between a shadow area with a high dye concentration and a highlight area with a low dye concentration. This is presumably because the dye concentration is extremely low in the highlight area represented by the low concentration ink, so that the change in hue is easily caused by a slight light scattering in the ink receiving layer. In the recording medium of the present invention, however, the dye is easily adsorbed on the surface of alumina hydrate particles, as the zirconium compound charges such particle surface. Consequently the dye does not intrude into the fine pores present in the alumina hydrate particles, thus reducing light scattering and leading to extremely little change in the hue in the highlight area and excellent halftone reproducibility.

On the other hand, according to the investigation of the present inventors, in case of combined use of silica and a zirconium compound, satisfactory halftone reproduction is difficult to achieve because the silica particles of sufficient ink receivability shows strong light scattering by the particles themselves.

The zirconium compound of the present invention also contributes to the stability of dispersion of alumina hydrate, and thus serves as a deflocculant. The terms "deflocculation" means a phenomenon where the particles are stably dispersed in a liquid medium by the strong repulsive force between the particles in such liquid medium. In order that the particle has such repulsive force, the particle is required to be charged and to form an electric double layer by the adsorption of an ion of the opposite polarity for neutralizing such charge. Such electric double layer causes electrostatic repulsion, thus preventing approaching of the particles. The deflocculation does not take place if the particle is not charged and is not provided with the electric double layer on the surface.

Due to that the zirconium compound is acidic in the liquid medium, it serves to charge the alumina hydrate particles and, by the anionic character, to form an electric double layer on the surface of the alumina hydrate particles, thereby stimulating deflocculation.

Such function cannot be achieved by alkali salts or alkali earth salts. For deflocculating the alumina hydrate particles, there is required an acid such as nitric acid or hydrochloric acid which is a general defloculant. For forming an ink receiving layer with a sufficient ink absorbing property, there is generally required, from the manufacturing standpoint, coating liquid of a high solid content. It is therefore required to prepare an alumina hydrate dispersion of a high concentration, but there is required a large amount of acid therefor resulting in decreasing pH of the dispersion, so that not only corrosion may occur in the manufacturing facility or in the storage, but also a viscosity of the dispersion tends to become higher. However, the zirconium compound of the present invention does not easily result in such pH reduction, even in case of preparation of an alumina hydrate dispersion of high concentration, and can therefore reduce the viscosity of dispersion.

In the present invention, there can be employed any zirconium compound that is not directly combined with alumina hydrate, and there are particularly preferred inorganic salts and organic acid salts of zirconium. Specific examples of such zirconium compound include halides such as $ZrOCl_2.nH_2O$, $Zr_2O_3Cl_2$, $ZrCl_4$, $ZrCl_3$, $ZrCl_2$, $ZrBr_4$, $ZrBr_3$, $ZrBr_2$, $ZrI_4$, $ZrI_3$, $ZrI_2$, $ZrF_4$, $ZrF_3$ and $ZrF_2$, oxo acid salts such as $Zr(NO_3)_4.nH_2O$, $Zr(NO_3)_2.nH_2O$, $Zr(SO_4)_2$, $Zr(SO_4)_2.nH_2O$, $ZrO(SO_4)$, $Zr(H_2PO_4)$, $ZrP_2O_7$, $ZrSiO_4$, $(NH_4)ZrO(CO_3)_2$, $ZrO(CO_3)_2.nH_2O$ and $ZrO(OH)_2.nH_2O$, and organic acid salts such as zirconyl acetate, zirconyl lactate, zirconyl stearate, zirconyl octate, zirconyl laurate and zirconyl mandate, and such zirconium compounds may be used singly or as a mixture of two or more kinds.

An amount of the above-mentioned zirconium compound to be added is preferably so selected that a zirconia/alumina ($ZrO_2/Al_2O_3$) ratio is within a range of from $1.0\times10^{-4}$ to $1.0\times10^{-1}$. An excessively large amount of the zirconium compound tends to result in a large change in a dye hue after printing, for example because of a lower pH of the coating liquid, while an excessively small amount of the zirconium compound reduces the dye adsorbing property, thus leading to bleeding, dot gain or migration.

The zirconium compound addition is preferably executed by adding a binder to a dispersion containing an alumina hydrate and a zirconium compound, in order to effectively achieve deflocculation of alumina hydrate particles and improvement of stability of the alumina hydrate dispersion after mixing the binder. The zirconium compound may be added in advance to the liquid medium, and the alumina hydrate particles and the binder may be thereafter added in succession, or the zirconium compound and the binder may be added successively to an alumina sol or an alumina slurry in which the alumina hydrate particles are dispersed. Also, a similar effect can be attained by simultaneous addition of the alumina hydrate particles and the zirconium compound to the liquid medium.

The alumina dispersion of the present invention can easily attain a high concentration with a solid content of 10% or higher at a relatively high pH of 3.0 or higher, by the use of an inorganic salt and/or an organic acid salt of zirconium. Thus, there can be obtained the alumina dispersion which remains stable even after the binder is added, and which is long in a pot life and excellent in binding and shaping properties of the alumina hydrate particles.

The ink receiving layer provided in the recording medium of the present invention is preferably so formed that the total pore volume is within a range of from 0.1 to 1.0 cm$^3$/g. When a pore volume of the ink receiving layer is larger than the above-mentioned range, cracks and powder drop-off in the ink receiving layer tend to generate, while when a pore volume is smaller than the above-mentioned range, the ink-absorbing property is reduced, so that bleeding tends to occur due to ink overflow from the ink receiving layer, in particular in case of multi-color printing.

The BET specific surface area of the ink receiving layer is preferably within a range of from 20 to 450 m$^2$/g. When a surface area is larger than the above-mentioned range, a glossiness of the ink receiving layer is lowered and the printed image tends to become hazy because of the increased level in haze. Also, when a surface area is smaller than the above-mentioned range, cracks tend to generate in the ink receiving layer.

The BET specific surface area and the pore volume mentioned above can be measured by the nitrogen adsorption/desorption method, after degassing it for 24 hours at 120° C.

The pore structure of the ink receiving layer is not determined by the alumina hydrate employed, but is influenced by various manufacturing conditions such as a kind and an amount of the binder, concentration, viscosity and dispersion state of the coating liquid, coating apparatus, coating head, coating amount, amount, temperature and direction of drying air, etc. For this reason, in the present invention, in order to attain the desired characteristics of the ink receiving layer, it is necessary to adjust the manufacturing conditions in an optimum range.

In the recording medium of the present invention, there may be employed various additives as needed. Such additives may be arbitrarily selected from various metal oxides, salts of divalent or polyvalent metals, and cationic organic substances. As the metal oxide, there is preferred oxides or hydroxides such as silica, boria, silicaboria, silicamagnesia, titania, zirconia and zinc oxide. As the salt of di- or polyvalent metal, there is preferred salts such as calcium carbonate and barium sulfate, and calcium nitrate, or halides such as magnesium chloride, calcium bromide, calcium iodide, zinc chloride, zinc bromide and zinc iodide, kaolin or talc. As the cationic organic substance there is preferred quaternary ammonium salts, polyamines and alkylamines. Such additive is preferably added in an amount not more than 20% by weight of alumina hydrate.

In the recording medium of the present invention, the binder may be employed in combination with an alumina hydrate and a zirconium compound. The binder can be arbitrarily selected from one or more water-soluble and water-dispersible polymers. Preferred examples of the binder include water-soluble polymers such as polyvinyl alcohol and modified products thereof, starch and modified products thereof, gelatin and modified products thereof, casein and modified products thereof, gum arabic, cellulose derivatives such as carboxymethyl cellulose, polyvinyl pyrrolidone, maleic anhydride and copolymers thereof and acrylic acid ester copolymers, and water-dispersible polymers such as conjugated diene copolymer latex such as SBR latex, functionally modified polymer latex, and vinyl copolymer latex such as ethylene-vinyl acetate copolymer latex.

The weight ratio of the alumina hydrate to a binder is preferably within a range of from 1:1 to 30:1. Within this range, the medium shows a high ink absorbing speed and a high optical density in the printed area. When a binder amount is lower than the above-mentioned range, a mechanical strength of the ink receiving layer becomes insufficient, so that cracks and power drop-off tend to generate. When a binder amount is higher than the above-mentioned range, the pore volume is reduced, so that the ink absorption amount tends to reduce. The weight ratio is more preferably within a range of from 3:1 to 20:1 in consideration of the ink-absorbing property and the difficulty in crack formation when the medium is bent.

Further, an organic acid may be advantageously employed in the recording medium of the present invention. The effect of such organic acid is to relax the temporarily increase in viscosity (called binder shock), presumably induced by the interaction with the zirconium compound at the time of mixing the binder consisting of water-soluble or water-dispersible polymer in the course of coating, though the function of such organic acid is not fully clarified. The co-use of the organic acid allows to prepare the coating liquid in a simple manner, without requiring a dispersing machine or a special equipment in which a high shear rate is loaded in the preparation of the coating liquid. It is anticipated that the addition of an organic acid lowers a pH value of the coating liquid, thereby deteriorating the stability of dispersion, but in fact the zirconium compound functions as a buffer for the organic acid so that the pH is not lowered by such an amount to deteriorate the dispersion stability. Consequently the co-use of organic acid rather improves the dispersion stability of the coating liquid, prolonging the pot life. Also it provides an effect of reducing the curl of the recording medium immediately after printing, thus improving a feeling in quality of the print and suppressing occurrences of friction on the recording head and of jamming of the recording medium in the course of printing operation.

The organic acid advantageously employed in the present invention is not particularly limited and can be, for example, a carboxylic acid, a sulfonic acid or an amino acid. Specific examples includes carboxylic acids such as formic acid, acetic acid, chloroacetic acid, dichloroacetic acid, trichloroacetic acid, fluoroacetic acid, trimethylacetic acid, methoxyacetic acid, mercaptoacetic acid, glycolic acid, acrylic acid, methacrylic acid, propionic acid, lactic acid, valeric acid, caproic acid, caprylic acid, capric acid, lauric acid, mylistic acid, palmitic acid, stearic acid, oleic acid, linolic acid, linoleic acid, cyclohexane carboxylic acid, phenylacetatic acid, benzoic acid, o-toluic acid, m-toluic acid, p-toluic acid, o-chlorobenzoic acid, m-chlorobenzoic acid, p-chlorobenzoic acid, o-bromobenzoic acid, m-borobenzoic acid, p-bromobenzoic acid, o-nitrobenzoic acid, m-nitrobenzoic acid, p-nitrobenzoic acid, oxalic acid, malonic acid, succinic acid, glutalic acid, azipic acid, tartaric acid, maleic acid, fumaric acid, citric acid, phthalic acid, isophothalic acid, terephthalic acid, salicilic acid, p-hydroxybenzoic acid, anthranylic acid, m-aminobenzoic acid, p-aminobenzoic acid, o-methoxybenzoic acid, m-methoxybenzoic acid and p-methoxybenzoic acid; sulfonic acids such as benzene sulfonic acid, methylbenzene sulfonic acid, ethylbenzene sulfonic acid, dodecylbenzene sulfonic acid, 2,4,6-trimethylbenzene sulfonic acid, 2,4-dimethylbenzene sulfonic acid, 5-sulfosalicilic acid, 1-sulfonaphthalene, 2-sulfonaphthalene, hexane sulfonic acid, octane sulfonic acid and dodecane sulfonic acid; and amino acids such as glycine, alanine, valine, α-aminolactic acid, γ-aminolactic acid, β-alanine, taulin, serine, ε-amino-n-caproic acid, leucine, norleucine or phenylalanine, and such acids may be employed singly or as a mixture of two or more acids.

The content of the organic acid is preferably within a range of from $5.0 \times 10^{-4}$ to 1.0 mol/g with respect to the weight of zirconium compound converted into oxide. An excessively large amount of the organic acid reduces the buffering effect of the zirconium compound, thus resulting a low pH and deteriorating the stability of the dispersion. On the other hand, an excessively small amount of the organic acid increases the possibility of the binder shock phenomenon at the time of mixing the binder with the coating liquid, and reduces the effect of decreasing the curl after the printing operation.

In the present invention, in addition to the alumina hydrate, zirconium compound and binder, there may be added, as needed, a pigment dispersing agent, a viscosifier, a pH adjusting agent, a lubricant, a fluidity modifier, a surfactant, a defoaming agent, a water-proofing agent, an antifoamer, a releasing agent, a foaming agent, a permeating agent, a colored dye, a fluorescent whitener, an ultraviolet absorbing agent, an antioxidant, a preserver or an antimold agent. The water-proofing agent can be arbitrarily selected from the already known ones such as halogenated quaternary ammonium salts and quaternary ammonium salt polymers.

In the present invention, the substrate for forming the ink receiving layer is not particularly limited and can be any sheet-shaped material, for example, paper such as suitably sized paper, non-sized paper and resin-coated paper coated with polyethylene, or a thermoplastic film. The thermoplastic film can be a transparent film such as of polyester, polystyrene, polyvinyl chloride, polymethyl methacrylate, cellulose acetate, polyethylene or polycarbonate, or a sheet rendered opaque by pigment filler or minute bubble.

The method for producing the recording medium of the present invention is not particularly limited and there can be employed an ordinary method of coating or internally addition alumina hydrate. More specifically, alumina hydrate is either dispersed in water and applied on the substrate, or internally added to a fibrous substance. As needed, there may be added a heating step as disclosed in Japanese Patent Application Laid-Open No. 9-86035.

The dispersing method of the dispersion containing the alumina hydrate having a boehmite structure, the zirconium compound and the binder may be selected from the ordinary dispersing methods. More specifically, there is advantageously employed a dispersing apparatus of crushing type such as a ball mill or a sand mill, or a dispersing apparatus of stirring type such as a homomixer or a homodisper.

In the present invention, the coating liquid for forming the ink receiving layer may be applied with an ordinary coating apparatus such as a blade coater, an air-knife coater, a roll coater, a brush coater, a curtain coater, a bar coater, a gravure coater and spray coater.

An amount of the dispersion to be applied, in the terms of dry solid weight, is preferably within a range of from 0.5 to 60 g/m² for attaining satisfactory ink-absorbing property, and, more preferably from 5 to 45 g/m² for attaining a faster ink absorbing speed and avoiding cracks and powder drop-off generation. After the coating, as needed, it is possible also to improve the surface smoothness of the ink receiving layer for example with calender rolls or to increase a surface glossiness by cast molding.

The ink employed in the image forming method of the present invention principally contains a coloring agent (dye or pigment), water-soluble organic solvent and water. The dye is preferably a water-soluble dye represented for example by a direct dye, an acid dye, a basic dye, a reactive dye or a food dye, and can be arbitrarily selected as long as there can be satisfied image requirements such as fixability, coloring ability, sharpness, stability, light fastness, etc. in combination with the recording medium described above.

The water-soluble dye is used generally by dissolving it in water or in a mixture of water and a water-soluble organic solvent. Such solvent mixture is preferably composed of water and water-soluble organic solvent, and the ink is preferably so prepared that the water content in the ink is within a range of from 20 to 90% by weight.

Examples of such water-soluble organic solvent include alkylalcohols with 1 to 4 carbon atoms such as methyl alcohol; amides such as dimethylformamide; ketones and ketone alcohols such as acetone; ethers such as tetrahydrofurane; polyalkylene glycols such as polyethylene glycol; alkylene glycols containing 2 to 6 carbon atoms in an alkylene moiety such as ethylene glycol; and lower alkyl ethers of polyhydric alcohols such as ethyelenglycol methyl ether. Among these water-soluble organic solvents, preferred are polyhydric alcohols such diethylene glycol and lower alkyl ethers of polyhydric alcohols such as triethylene glycol monomethylether and triethylene glycol monoethylether. Particularly preferred are polyhydric alcohols as they are effective as a lubricant for preventing the nozzle clogging resulting from precipitation of the water-soluble dye cause by water evaporation from the ink.

The ink may further contain a solubilizing agent. The solubilizing agent is represented by nitrogen-containing heterocyclic ketones, which drastically can improve a solubility of the water-soluble dye in the solvent. Preferred examples are N-methyl-2-pyrrolidone and 1,3-dimethyl-2-imidazolidine. There may be further added other additives for improving the characteristics such as a surfactant for increasing the permeability of the ink components into the plain paper, a viscosity adjusting agent, a surface tension adjusting agent, a pH adjusting agent, and a specific resistivity adjusting agent.

The image formation by ink deposition onto the above-described recording medium is achieved by ink-jet recording method, which can be any method capable of effectively ejecting the ink from a nozzle and depositing the ink onto the recording medium. In particular, there can be effectively utilized an ink-jet recording method disclosed in Japanese Patent Application No. 54-59936 in which the ink subjected to the function of thermal energy undergoes a rapid volumic change, and is ejected from the nozzle by a force generated by such state change.

In the following the present invention will be explained in more detail by examples thereof, but the present invention is by no means limited by such examples.

The physical properties used in the present invention were measured in the following manner.

1. Crystallinity and Degree of Parallelization

A recording medium in a sheet form and a powdered ink receiving layer separated from the recording medium were subjected to an X-ray diffractometer, and, from the obtained pattern, the intensity at 2θ=10° and the peak intensities of the (020) and (120) planes were measured. Also, an ink receiving layer separated from the recording medium was subjected to an X-ray diffractometer to measure the peak intensities of the (020) and (120) planes. Then the crystallinity and the degree of parallelization were calculated from the following equations:

Crystallinity=(peak intensity of (020) plane)/(intensity at 2θ=10°);

Intensity ratio of the powder=(peak intensity of (020) plane of powder)/(peak intensity of (120) plane of powder);

Intensity ratio of the recording medium (ink receiving layer)= (peak intensity of (020) plane of recording medium)/(peak intensity of (120) plane of recording medium);

and

Degree of parallelization=(intensity ratio of recording medium)/ (intensity ratio of powder).

In the foregoing equations, the X-ray diffraction measurement was executed under the following conditions:

Measuring apparatus: RAD-2R (trade name, a product of Rigaku Denki Co.);

Target: CuKα;

Optical system: Wide-angle goniometer (with bent graphite monochrometer;

Gonio radius: 185 mm;

Slit: DS 1°, RS 1°, SS 0.15 mm;

X-ray output: 40 kV, 30 mA;

Measuring conditions: 2θ–θ method with continuous scanning at a pitch of 2θ=0.02°, with a rate of 2°/min in 2θ=10° to 90°.

2. BET Specific Surface Area, Pore Volume

Measurement was carried out by the nitrogen adsorption-desorption method after sufficient degassing of alumina hydrate and recording medium by heating.

Measuring apparatus: Autosorb 1 (trade name, a product of Quanthachrome Co.)

2-1. The BET specific surface area was calculated by the method of Brunauer et al. (J. Am. Chem. Soc., 60, p.309 (1938).

2-2. The pore volume was calculated by the method of Barrett et al. (J. Am. Chem. Soc., 73, p.373 (1951).

3. Particle Form

A specimen was prepared by dispersing alumina hydrate in ion-exchanged water, then dropping the dispersion on a collidion film, and the specimen was observed under a transmission electron microscope (H-500, trade name, a product of Hitachi Co.) to obtain the aspect ratio and the particle diameter.

4. Physical Properties of Coating Liquid 4-1) Dispersion State

A dispersion state was evaluated by visual observation. Dispersion in a satisfactory colloid state without gellation or precipitation was ranked as "A", and that of unsatisfactory dispersion with gellation, precipitation or undissolved substance was ranked as "C".

4-2) Initial Viscosity

The viscosity was measured at 25° C. with a Brookfield rotary viscosimeter (Viscometer, trade name, a product of Tokimec Co.) and with a low viscosity adaptor and a No. 2 rotor (rotation of 30 rpm).

4-3) Binder Shock

A viscous state of the dispersion at the time of mixing a water-soluble polymer and/or a water-dispersible polymer with the dispersion was evaluated by visual observation. A dispersion showing gellation by rapid viscosity increase was ranked as "C", a dispersion showing a significant viscosity increase immediately after the addition but recovering fluidity thereafter was ranked as "B", and a dispersion maintaining the fluidity with little viscosity increase even immediately after the addition was ranked as "A".

4-4) Pot Life

The dispersion was left to stand in a closed container for 10 days at 25° C., and a viscosity was then measured under the conditions same as in Item 4-2) above, and the pot life was evaluated from a ratio of a viscosity after 10 days to the initial viscosity. The lower is better.

4-5) pH

A pH value was measured at 25° C. with a pH meter (Castany D-14, trade name, a product of Horiba Mfg. Co., with a pH electrode 6350-10-D).

4-6) Film Forming Ability

Alumina dispersion was gravure-coated at a coating speed of 200 m/min on a transparent polyester film (Lumirror T, trade name, a product of Toray Co.; 100 μm thick) under a corona discharge treatment, and was dried at 120° C. to form a coated layer. A coated layer with uniform structure and without cracks even at a dry thickness not less than 40 μm was ranked as "AA"; a coated layer showing cracks or damages within a thickness range of from 30 to 40 μm was ranked as "A"; a coated layer showing cracks or damages within a thickness range of from 20 to 30 μm was ranked as "B"; and a coated showing cracks or damages even with a thickness not more than 20 μm was ranked as "C". The cracks and damages were evaluated by visual observation.

4-7) Bulk Forming Ability 15 ml of alumina dispersion was placed in a transparent plastic cup (Pack Ace 120 cc, trade name, a product of Teraoka Co.) and was dried, without covering, for 24 hours in a dry oven of 100° C. to form a gelled bulk. A gelled bulk not showing cracks and not easily broken when manipulated was ranked as "A"; a gelled bulk not showing cracks but easily broken when manipulated was ranked as "B"; and a case where the gelled bulk was not formed because of cracks was ranked as "C". The cracks in the gelled bulk were evaluated by visual observation.

5. Transparency

A total luminous transmittance (%) of a specimen provided with an ink receiving layer on a transparent PET film was measured according to the method of JIS K 7105, with a haze meter (NDH-1001DP, trade name, a product of Nihon Denshoku Co.).

6. Crack

A length of crack of a specimen provided with an ink receiving layer on a transparent PET film was measured under visual observation. A specimen having no cracks under visual observation was ranked as "A"; a specimen having cracks not more than 5 mm in length was ranked as "B"; and a specimen having cracks not less than 5 mm in length was ranked as "C".

7. Glossiness

A glossiness of a specimen provided with an ink receiving layer on a white PET film was measured at 7 points in the non-printed area with a gloss meter (Gloss Checker IG-320, trade name, a product of Horiba Mfg. Co.) and the measured values were averaged.

8. Printing Characteristics

Ink-jet recording was carried with an ink-jet printer BJC-420J (trade name, a product of Canon Co.) for four-color recording of yellow (Y), magenta (M), cyan (C) and black (Bk) with an ink-jet head provided with 128 nozzles at a pitch of 16 nozzles/mm, in combination with a regular ink cartridge BC-21 and a photo ink cartridge BC-22 (in comparison with the regular inks, the dye concentration is about ⅓ for cyan and magenta inks, about ½ for a black ink and same for a yellow ink), and in each cartridge evaluation were performed on the following items 8-1-1) to 8-2-7). The evaluation of the printing characteristics was conducted solely on a recording medium provided with an ink receiving layer on a white PET film.

8-1. Evaluation Items for Regular Inks 8-1-1) Ink-absorbing Property

The drying state of ink on the recording medium surface, after solid printing with Y, M, C and Bk inks either in single-color printing or in multi-color combination, was investigated by touching the printed area with a finger. The ink amount in the single-color printing was taken as 100% (1 dot=40 ng; 360×360 dots being printed per square inch). Similarly 100% printing was superposed with inks of three colors, and a specimen in which an ink is not attached to the finger at an ink amount of 350% was ranked as "A"; a specimen in which an ink is not attached to the finger at an ink amount of 250% was ranked as "B"; and a specimen in which an ink is attached to the finger at an ink amount of 150% was ranked as "C".

8-1-2) Optical Density of Image

The optical density of a solid-printed portion by a magenta ink with an ink amount of 100% was evaluated with a Macbeth reflective densitometer RD1255 (an optical density of in magenta color was used for evaluation as it was lowest among four colors in all the examples).

8-1-3) Bleeding, Beading and Repelling

The bleeding, beading and repelling on a surface of the recording medium were evaluated by visual observation, after solid printing with Y, M, C and Bk inks either in single-color printing or in multi-color combination. The ink amount at the single-color printing was taken as 100%. A specimen in which these defects were not recognized at an ink amount of 350% was ranked as "A"; a specimen in which these defects were not recognized at an ink amount of 250% was ranked as "B"; and a specimen in which such defects were recognized at the same ink amount was ranked as "C".

8-1-4) Dot Gain

After printing complicated KANJI characters such as "電", "驚" and the like with Y, M, C and Bk inks either in single-color printing or in multi-color combination, the recorded image was evaluated by visual observation. The ink amount at the single-color printing was taken as 100%. A specimen showing sharp characters with clear edges at an ink amount of 350% was ranked as "A"; a specimen showing sharp characters with clear edges at an ink amount of 250% was ranked as "B"; and a specimen in which the characters were filled in and illegible or significantly inferior in quality under the same condition was ranked as "C".

8-1-5) Migration

After printing a solid grating pattern having four white lines having a width of 1, 3 or 5 mm in the vertical and horizontal directions in a solid print area of 5×5 cm with Y, M, C and Bk inks either in single-color printing or in multi-color combination, so as to become an ink amount of 300%, the printed specimen was left to stand for 7 days in an environmental conditions of 30° C. and 80%RH, and was then evaluated by visual observation. A specimen in which white lines of 1 mm were kept without being filled in was ranked as "A"; a specimen in which white lines of 3 mm were kept without being filled in was ranked as "B"; and a specimen in which the white lines of 5 mm were filled in by bleeding was ranked as "C".

8-1-6) Halftone Reproducibility

A black gradation pattern of 0 to 100% was printed with Y, M, C and Bk inks, and the change thereafter in hue of the recorded image was evaluated by visual observation. A specimen where a halftone was formed without change in hue from black to gray and white was ranked as "A"; and a specimen in which the halftone area shows a hue other than gray was evaluated as "C".

8-1-7) Circularity

Dots were individually printed with a Bk ink, and the longer diameter D and the shorter diameter d of each dot were measured under a microscope, and the circularity was defined by "d/D".

8-1-8) Curl After Printing

On an A4-sized recording medium, C and Y inks were printed with an ink amount of 100% each to obtain a solid green print on the entire surface, and the maximum amount of curl immediately after output was measured with a measuring scale. A maximum curl amount not more than 10 mm was ranked as "A"; a maximum curl amount within a range of from 10 to 20 mm was ranked as "B"; and a maximum curl amount exceeding 20 mm was ranked as "C".

8-2. Evaluation Items for Photo Inks 8-2-1) Ink-absorbing Property

The drying state of ink on the recording medium surface, after solid printing with Y, M, C and Bk inks either in single-color printing or in multi-color combination, was investigated by touching the printed area with a finger. The ink amount in the single-color printing was taken as 100% (1 dot=40 ng; 360×360 dots being printed per square inch). Similarly 100% printing was superposed with inks of three colors, and a specimen in which an ink is not attached to the finger at an ink amount of 350% was ranked as "A"; a specimen in which an ink is not attached to the finger at an ink amount of 250% was ranked as "B"; and a specimen in which an ink is attached to the finger at an ink amount of 150% was ranked as "C".

8-2-2) Optical Density of Image

The optical density of a solid-printed portion, printed with a magenta ink three times, so as to obtain an ink amount of 300%, was evaluated with a Macbeth reflective densitometer RD1255 (an optical density in a magenta color was used for evaluation as it was lowest among four colors in all the examples).

8-2-3) Bleeding, Beading and Repelling

The bleeding, beading and repelling on a surface of the recording medium were evaluated by visual observation, after solid printing with Y, M, C and Bk inks either in single-color printing or in multi-color combination. The ink amount at the single-color printing was taken as 100%. A specimen in which these defects were not recognized at an ink amount of 350% was ranked as "A"; a specimen in which these defects were not recognized at an ink amount of 250% was ranked as "B"; and a specimen in which such defects were recognized under the same condition was ranked as "C".

8-2-4) Dot Gain

After printing complicated KANJI characters such as "電", "驚" and the like with Y, M, C and Bk inks either in single-color printing or in multi-color combination, the recorded image was evaluated by visual observation. The ink amount at the single-color printing was taken as 100% A specimen showing sharp characters with clear edges at an ink amount of 350% was ranked as "A"; a specimen showing sharp characters with clear edges at an ink amount of 250% was ranked as "B"; and a specimen in which the characters were filled in and illegible or significantly inferior in quality under the same condition was ranked as "C".

8-2-5) Migration

After printing a solid grating pattern having four white lines of a width having 1, 3 or 5 mm in the vertical and horizontal directions in a solid print area of 5×5 cm with Y, M, C and Bk inks either in single-color printing or in multi-color combination, so as to become an ink amount of 300%, the printed specimen was let to stand for 7 days in an environmental conditions of 30° C. and 80% RH, and was then evaluated by visual observation. A specimen in which white lines of 1 mm were kept without being filled in was ranked as "A"; a specimen in which white lines of 3 mm were kept without being filled in was ranked as "B"; and a specimen in which the white lines of 5 mm were filled in by bleeding was ranked as "C".

8-2-6) Halftone Reproducibility

A black gradation pattern of 0 to 300% was printed with Y, M, C and Bk inks, and the change thereafter in hue of the recorded image was evaluated by visual observation. A specimen in which a halftone was formed without change in hue from black to gray and white was ranked as "A"; and a specimen in which the halftone area shows a hue other than gray was evaluated as "C".

8-2-7) Circularity

Dots were individually printed with a Bk ink, and the longer diameter D and the shorter diameter d of each dot were measured by a microscope, and the circularity was defined by "d/D".

PREPARATIVE EXAMPLES 1 AND 2

Preparation of Alumina Hydrate A and B

Aluminum dodexyde was prepared by a method described in U.S. Pat. No. 4,242,271. Then, aluminum dodexyde was hydrolyzed according to a method described in U.S. Pat. No. 4,202,870 to obtain an alumina slurry. Then, water was added to the alumina slurry to obtain a solid content of alumina hydrate of 7.9%. The alumina slurry had a pH of 9.5.

The slurry was subjected to pH adjustment by the addition of a 3.9% nitric acid solution, and colloidal sols were prepared under the respective ripening conditions shown in Table 1. The colloidal sols were spray dried at 75° C. to obtain alumina hydrates A and B as shown in Table 1.

The BET specific surface area and the pore volume of these alumina hydrates were measured in the following manner.

The pore volume (PV) was measured with the nitrogen adsorption-desorption method with an Autosorb (trade name, manufactured by Quanthachrome Co.), after degassing the sample for 24 hours at 120° C.

The BET specific surface area (SA) was calculated by the method of Brunauer et al.

The obtained results are shown in Table 1.

TABLE 1

| Preparative Example | 1 | 2 |
| --- | --- | --- |
| Alumina hydrate | A | B |
| Ripening pH | 6.8 | 6.4 |
| Ripening temp. (° C.) | 45 | 50 |
| Ripening period (days) | 20 | 10 |
| Ripening apparatus | oven | oven |
| SA (m$^2$/g) | 210.5 | 185.3 |

TABLE 1-continued

| Preparative Example | 1 | 2 |
| --- | --- | --- |
| PV (cm$^3$/g) | 0.62 | 0.58 |
| Content (% as Al$_2$O$_3$) | 79.2 | 76.5 |

PREPARATIVE EXAMPLES 3 to 6

Preparation of Alumina Hydrates C, D, E and F

Aluminum dodexyde was prepared by a method described in U.S. Pat. No. 4,242,271. Then, aluminum dodexyde was hydrolyzed according to a method described in U.S. Pat. No. 4,202,870 to obtain an alumina slurry. Then water was added to the alumina slurry to obtain a solid content of the alumina hydrate having a boehmite structure of 7.9%. The alumina slurry had a pH of 9.2. The slurry was subjected to pH adjustment by the addition of a 3.9% nitric acid solution, and colloidal sols were prepared under the respective ripening conditions shown in Table 2. The colloidal sols were spray dried at 85° C. to obtain alumina hydrate powder having a boehmite structure. The obtained an alumina hydrate had a boehmite crystal structure and a planar particle form. The physical properties of alumina hydrates C, D, E and F were measured as explained in the foregoing. The obtained results are shown in Table 2.

TABLE 2

| Preparative Example | 3 | 4 | 5 | 6 |
| --- | --- | --- | --- | --- |
| Alumina hydrate | C | D | E | F |
| Ripening pH | 6.7 | 6.7 | 6.4 | 6.3 |
| Ripening temp. (° C.) | 47 | 49 | 50 | 50 |
| Ripening period (days) | 14 | 17 | 19 | 15 |
| Ripening apparatus | oven | oven | oven | oven |
| Crystallinity | 23.2 | 38.5 | 76.8 | 48.3 |
| BET surface area (m$^2$/g) | 200 | 210 | 235 | 190 |
| Pore volume (cm$^3$/g) | 0.65 | 0.75 | 0.31 | 0.92 |
| Average aspect ratio | 5 | 7 | 9 | 6 |
| Ave. particle diameter (nm) | 21 | 33 | 40 | 13 |
| Content (% as Al$_2$O$_3$) | 79.2 | 79.4 | 78.8 | 78.7 |

EXAMPLE 1

3.8 parts by weight of zirconium oxychloride hydrate (ZC) (8.0% by weight converted as ZrO$_2$) and 110 parts by weight of an alumina hydrate were added in succession to 390 parts by weight of ion exchanged water, and the mixture was stirred for 30 minutes with a dispersing apparatus (T.K.Robomix Homodisper type 2.5, trade name, a product of Tokushu Kika Kogyo Co.) at 1,500 rpm. Then, while stirring it at 2,500 rpm, 157 parts by weight of a 10% aqueous solution of polyvinyl alcohol (PVA) (GH-17, trade name, a product of Nippon Synthetic Chemicals Co.) were mixed. The mixture was further stirred for 30 minutes to obtain an alumina dispersion with a weight ratio (P/B) of the alumina hydrate to a polymer of 7/1 and a solid content of 19.9% by weight.

The physical properties of the alumina dispersion were evaluated with the methods described in the foregoing, and the obtained results are summarized in Table 3.

EXAMPLES 2 TO 5

Alumina dispersions were prepared in the same manner as in the example 1, except that the added amount of zirconium oxychloride (ZC) was changed to $1.13 \times 10^{-3}$ part by weight for Example 2, to 0.021 part by weight for Example 3, to 20.2 parts by weight for Example 4, and to 41.3 parts by weight for Example 5. Results of similar evaluations are shown in Table 3.

EXAMPLES 6 AND 7

Alumina dispersions were prepared in the same manner as in the example 1, except that zirconium oxychloride hydrate (ZC) and the added amount thereof were changed to zirconyl nitrate hydrate (ZN, 46.0% in content converted as $ZrO_2$) and 1.8 part by weight, respectively, for Example 6, and to zirconyl acetate (ZA, 54.7% in content converted as $ZrO_2$) and 1.5 part by weight, respectively, for Example 7. Results of similar evaluations are shown in Table 3.

EXAMPLES 8 TO 11

Alumina dispersions were prepared in the same manner as in Example 6, except that the alumina hydrate in Example 6 was replaced by alumina hydrate B and the added amount of a 10% aqueous solution of polyvinyl alcohol was changed to 917 parts by weight for Example 8, to 367 parts by weight for Example 9, to 55.0 parts by weight for Example 10, and to 39.3 parts by weight for Example 11. Results of similar evaluations are shown in Table 3.

EXAMPLES 12 AND 13

Alumina dispersions were prepared in the same manner as in the example 6, except that the alumina hydrate in the example 6 was replaced by alumina hydrate B and the 10% aqueous solution of polyvinyl alcohol and the added amount thereof were changed to a 10% aqueous solution of polyvinyl pyrrolidone (K-90, trade name, a product of Gokyo Sangyo Co.) with a same amount for Example 12, and to a mixture of 28.7 parts by weight of polyvinyl acetate resin emulsion (Saibinol AS-550, trade name, a product of Saide Chemical Co.; solid content 54.7% by weight) and 128.3 parts by weight of ion exchanged water, respectively, for Example 13. Results of similar evaluations are shown in Table 3.

EXAMPLE 14

1.8 parts by weight of zirconyl nitrate hydrate (ZN: 46.0% converted as $ZrO_2$ content), 110 parts by weight of alumina hydrate B and 0.65 parts by weight of formic acid were added in succession to 390 parts by weight of ion exchanged water, and the mixture was stirred for 30 minutes with a dispersing apparatus (T.K.Robomix Homodisper type 2.5, trade name, a product of Tokushu Kika Kogyo Co.) at 1,500 rpm. Then, while the stirring was continued under the same condition, 157 parts by weight of a 10% aqueous solution of polyvinyl alcohol (PVA) (GH-17, trade name, a product of Nippon Synthetic Chemicals Co.) were mixed, and the mixture was further stirred for 30 minutes to obtain alumina dispersion having a weight ratio (P/B) of an alumina hydrate to a polymer of 7/1 and a solid content of 19.7% by weight.

The physical properties of the above alumina dispersion were evaluated with the methods described in the foregoing, and the obtained results are summarized in Table 4.

EXAMPLES 15 TO 17

Alumina dispersions were prepared in the same manner as in the example 14, except that the added amount of formic acid was changed to 0.030 part by weight for Example 15, to 28.6 parts by weight for Example 16, and to 46.0 parts by weight for Example 17. Results of similar evaluations are shown in Table 4.

EXAMPLES 18 AND 19

Alumina dispersions were prepared in the same manner as in the example 14, except that formic acid and the added amount thereof in the example 14 were changed to 1.26 parts by weight of lactic acid for Example 18, and to 1.75 parts by weight of oxalic acid for Example 19. Results of similar evaluations are shown in Table 4.

TABLE 3

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Alumina hydrate | A | A | A | A | A | A | A | B | B | B | B | B | B |
| Polymer | PVA | PVA | PVA | PVA | PVA | PVA | PVA | PVA | PVA | PVA | PVA | PVP | polyvinyl acetate emulsion |
| P/B | 7/1 | 7/1 | 7/1 | 7/1 | 7/1 | 7/1 | 7/1 | 12/1 | 3/1 | 20/1 | 28/1 | 7/1 | 7/1 |
| Zirconium compound | ZC | ZC | ZC | ZC | ZC | ZN | ZA | ZN | ZN | ZN | ZN | ZN | ZN |
| $ZrO_2/Al_2O_3$ | $1.6 \times 10^{-2}$ | $1.3 \times 10^{-5}$ | $2.4 \times 10^{-4}$ | $7.7 \times 10^{-2}$ | $1.8 \times 10^{-1}$ | $9.8 \times 10^{-3}$ | $9.8 \times 10^{-3}$ | $9.9 \times 10^{-3}$ | ← | ← | ← | ← | ← |
| Solid content | 19.7 | 19.2 | 19.2 | 21.7 | 24.1 | 19.9 | 19.8 | 14.6 | 17.4 | 21.6 | 21.9 | 19.9 | 19.9 |
| Dispersion state | A | A | A | A | A | A | A | A | A | A | A | A | A |
| Initial viscosity (cP) | 125 | 173 | 151 | 131 | 230 | 120 | 127 | 250 | 200 | 108 | 105 | 118 | 120 |
| Binder shock | B | B | B | B | B | B | B | B | B | B | B | B | B |
| Pot life | 1.7 | 3.2 | 2.1 | 1.6 | 3.4 | 1.7 | 1.6 | 3.6 | 2.3 | 1.6 | 3.0 | 1.7 | 1.8 |
| pH | 4.30 | 4.78 | 4.51 | 4.01 | 3.51 | 4.28 | 4.47 | 4.30 | 4.30 | 4.29 | 4.27 | 4.28 | 4.28 |
| Film forming ability | AA | AA | AA | AA | AA | AA | AA | AA | AA | AA | A | A | A |
| Bulk forming ability | A | A | A | A | A | A | A | A | A | A | A | A | A |

TABLE 4

| Example | 14 | 15 | 16 | 17 | 18 | 19 |
|---|---|---|---|---|---|---|
| Alumina hydrate | B | B | B | B | B | B |
| Polymer | PVA | PVA | PVA | PVA | PVA | PVA |
| P/B | 7/1 | 7/1 | 7/1 | 7/1 | 7/1 | 7/1 |
| Zirconium compound | ZN | ZN | ZN | ZN | ZN | ZN |
| $ZrO_2/Al_2O_3$ | $9.9 \times 10^{-3}$ | $9.9 \times 10^{-3}$ | $9.9 \times 10^{-3}$ | $9.9 \times 10^{-3}$ | $9.9 \times 10^{-3}$ | $9.9 \times 10^{-3}$ |
| Organic acid | Formic acid | Formic acid | Formic acid | Formic acid | Lactic acid | Oxalic acid |
| Organic acid/$ZrO_2$ | $1.7 \times 10^{-2}$ | $8.0 \times 10^{-4}$ | $7.5 \times 10^{-1}$ | $1.2 \times$ | $1.7 \times 10^{-2}$ | $1.7 \times 10^{-2}$ |
| Solid content (%) | 19.9 | 19.9 | 19.9 | 19.9 | 19.9 | 19.9 |
| Dispersion State | A | A | A | A | A | A |
| Initial viscosity | 105 | 112 | 132 | 235 | 115 | 113 |
| Binder shock | A | A | A | A | A | A |
| Pot life | 1.2 | 1.4 | 1.5 | 2.7 | 1.3 | 1.3 |
| pH | 4.26 | 4.31 | 4.10 | 3.71 | 4.27 | 4.18 |
| Film forming ability | AA | AA | AA | AA | AA | AA |
| Bulk forming ability | A | A | A | A | A | A |

EXAMPLE 20

3.8 parts by weight of zirconium oxychloride hydrate (ZC content: 38.0% by weight converted as oxide) and 110 parts by weight of alumina hydrate C were added in succession to 390 parts by weight of ion exchanged water, and the mixture was stirred for 30 minutes with a dispersing apparatus (T.K. Robomix Homodisper type 2.5, trade name, a product of Tokushu Kika Kogyo Co.) at 1,500 rpm. Then, while stirring it at 2,500 rpm, 157 parts by weight of a 10% aqueous solution of polyvinyl alcohol (Gosenol GH-17, trade name, a product of Nippon Synthetic Chemicals Co.) were mixed. The mixture was further stirred for 30 minutes to obtain a coating liquid having a weight ratio (P/B) of an alumina hydrate to a polymer of 7/1 and a solid content of 19.9% by weight.

The coating liquid mentioned above was gravure-coated at a coating speed of 10 m/min to transparent and opaque PET films having a thickness of 100 μm (Lumirror, trade name, a product of Toray Co.), as a substrate, under a corona discharge treatment and was dried at 120° C. to obtain a ink receiving layer with a dry thickness of 40 μm, thereby obtaining the recording medium of the present invention. The obtained recording medium did not show a presence of an Al—O—Zr bond in the ESCA measurement. The physical properties were measured with the methods described above, and the obtained results are shown in Table 5.

EXAMPLES 21 TO 23

Recording media were prepared in the same manner as in the example 20, except that alumina hydrate in the example 20 was respectively replaced by alumina hydrates D, E and F of the Preparative Examples 4 to 6. The obtained recording medium did not show a presence of an Al—O—Zr bond in the ESCA measurement. The physical properties measured in a similar manner are shown in Table 5.

EXAMPLES 24 TO 25

Recording media were prepared in the same manner as in the example 20, except that the addition amount of ZC in the example 20 was changed to 0.021 part by weight for Example 24, and to 20.2 parts by weight for Example 25. The obtained recording medium did not show a presence of an Al—O—Zr bond in the ESCA measurement. The physical properties measured in a similar manner are shown in Table 5.

EXAMPLES 26 AND 27

Recording media were prepared in the same manner as in the example 20, except that ZC and the addition amount thereof in the example 20 were changed to 1.8 part by weight of zirconyl nitrate (ZN content: 46.0% converted in oxide) for Example 26, and to 1.5 part by weight of zirconyl acetate (ZA content: 54.7% converted in oxide) for Example 27. The obtained recording medium did not show a presence of an Al—O—Zr bond in the ESCA measurement. The physical properties measured in a similar manner are shown in Table 5.

TABLE 5

| Example | 20 | 21 | 22 | 23 | 24 | 25 | 26 | 27 |
|---|---|---|---|---|---|---|---|---|
| Alumina hydrate | C | D | E | F | C | C | C | C |
| Zirconium compound | ZC | ZC | ZC | ZC | ZC | ZC | ZN | ZA |
| $ZrO_2/Al_2O_3$ | $1.6 \times 10^{-2}$ | $1.6 \times 10^{-2}$ | $1.6 \times 10^{-2}$ | $1.6 \times 10^{-2}$ | $2.4 \times 10^{-4}$ | $7.7 \times 10^{-2}$ | $9.8 \times 10^{-3}$ | $9.8 \times 10^{-3}$ |
| BET specific surface area (m²/g) | 185 | 190 | 200 | 180 | 183 | 187 | 185 | 184 |
| Pore volume (cm³/g) | 0.63 | 0.73 | 0.30 | 0.87 | 0.64 | 0.63 | 0.63 | 0.63 |
| Degree of parallelization | 2.6 | 3.0 | 2.1 | 1.7 | 2.6 | 2.6 | 2.6 | 2.6 |
| Dispersion state | A | A | A | A | A | A | A | A |
| Initial viscosity (cP) | 125 | 127 | 131 | 128 | 150 | 130 | 121 | 128 |
| Binder shock | B | B | B | B | B | B | B | B |
| Pot life | 1.7 | 1.6 | 1.8 | 1.6 | 2.2 | 1.7 | 1.6 | 1.6 |
| pH | 4.30 | 4.40 | 4.28 | 4.33 | 4.52 | 4.01 | 4.27 | 4.48 |
| Total luminous transmittance (%) | 81.4 | 82.5 | 83.0 | 79.4 | 80.6 | 82.0 | 81.5 | 81.2 |
| Crack | A | A | A | A | A | A | A | A |
| Glossiness | 63.6 | 63.2 | 63.2 | 61.5 | 62.5 | 63 | 63.1 | 63.2 |
| Regular ink | | | | | | | | |
| Ink absorption | A | A | A | A | A | A | A | A |
| Optical density of | 1.85 | 1.87 | 1.86 | 1.84 | 1.84 | 1.85 | 1.86 | 1.84 |

TABLE 5-continued

| Example | 20 | 21 | 22 | 23 | 24 | 25 | 26 | 27 |
|---|---|---|---|---|---|---|---|---|
| image |  |  |  |  |  |  |  |  |
| Bleeding | A | A | A | A | A | A | A | A |
| Beading | A | A | A | A | A | A | A | A |
| Repelling | A | A | A | A | A | A | A | A |
| Dot gain | A | A | A | A | A | A | A | A |
| Migration | A | A | A | A | A | A | A | A |
| Halftone reproduction | A | A | A | A | A | A | A | A |
| Circularity | 0.86 | 0.92 | 0.84 | 0.82 | 0.86 | 0.86 | 0.86 | 0.86 |
| Curl after printing | B | B | B | B | B | B | B | B |
| Photo ink |  |  |  |  |  |  |  |  |
| Ink absorption | A | A | A | A | A | A | A | A |
| Optical density of image | 1.71 | 1.72 | 1.73 | 1.69 | 1.69 | 1.70 | 1.72 | 1.70 |
| Bleeding | A | A | A | A | A | A | A | A |
| Beading | A | A | A | A | A | A | A | A |
| Repelling | A | A | A | A | A | A | A | A |
| Dot gain | A | A | A | A | A | A | A | A |
| Migration | A | A | A | A | A | A | A | A |
| Halftone reproduction | A | A | A | A | A | A | A | A |
| Circularity | 0.85 | 0.91 | 0.84 | 0.81 | 0.86 | 0.87 | 0.85 | 0.85 |

EXAMPLE 28

1.8 part by weight of ZN, 110 parts by weight of alumina hydrate B and 0.65 part by weight of formic acid were added in succession to 390 parts by weight of ion exchanged water, and the mixture was stirred for 30 minutes with a dispersing apparatus (T.K. Robomix Homodisper type 2.5, trade name, a product of Tokushu Kika Kogyo Co.) at 1,500 rpm. Then, while stirring it under the same condition, 157 parts by weight of 10% aqueous solution of polyvinyl alcohol (Gosenol GH-17, trade name, a product of Nippon Synthetic Chemicals Co.) were mixed. The mixture was stirred further for 30 minutes to obtain a coating liquid having a weight ratio (P/B) of an alumina hydrate to a polymer of 7/1 and a solid content of 19.7% by weight.

The coating liquid mentioned above was gravure coated at a coating speed of 10 m/min to transparent and opaque PET films of a thickness of 100 $\mu$m (Lumirror, trade name, a product of Toray), as a substrate, under a corona discharge treatment and was dried at 120° C. to obtain an ink receiving layer having a dry thickness of 40 $\mu$m, thereby obtaining the recording medium of the present invention. The obtained recording medium did not show a presence of an Al—O—Zr bond in the ESCA measurement. The physical properties were measured with the methods described above, and the obtained results are shown in Table 6.

EXAMPLES 29 AND 30

Recording media were prepared in the same manner as in the example 28, except that the addition amount of formic acid was changed to 0.030 part by weight for Example 29, and to 28.6 parts by weight for Example 30. The obtained recording medium did not show a presence an of Al—O—Zr bond in the ESCA measurement. The physical properties measured in a similar manner are shown in Table 6.

EXAMPLES 31, 32

Recording media were prepared in the same manner as in the example 30, except that formic acid and the addition amount thereof in Example 28 were changed to 1.26 part by weight of lactic acid for Example 31, and 1.75 parts by weight of oxalic acid for Example 32. The obtained recording medium did not show a presence of an Al—O—Zr bond in the ESCA measurement. The physical properties measured in a similar manner are shown in Table 6.

Comparative Example 1

While stirring 500 parts by weight of pseudo-boehmite sol (Cataloid AS-3, trade name, a product of Shokubai Kasei Kogyo Co., with a solid content of 7% by weight) were stirred with a dispersing apparatus (T.K. Robomix Homodisper type 2.5, trade name, a product of Tokushu Kika Kogyo Co.) at 2,500 rpm, and 50 parts by weight of a 10% aqueous solution of polyvinyl alcohol (Gosenol GH-17, trade name, a product of Nippon Synthetic Chemicals Co.) were added. The mixture was further stirred for 30 minutes to obtain a coating liquid having a weight ratio (P/B) of an alumina hydrate to a polymer of 7/1 and a solid content of 7.3% by weight.

Thereafter, a recording medium was obtained in the same manner as in Example 20. The physical properties were measured with the methods described above, and the obtained results are shown in Table 6.

Comparative Example 2

1.7 part by weight of ZC and 500 parts by weight of an amorphous alumina sol (Alumina Sol 100, trade name, a product of Nissan Chemical Industries Co., with a solid content 10% by weight) were added in succession to 214 parts by weight of ion exchanged water, and the mixture was stirred for 30 minutes with a dispersing apparatus (T.K. Robomix Homodisper type 2.5, trade name, a product of Tokushu Kika Kogyo Co.) at 3,000 rpm, and, while stirring it at 4,000 rpm, 50 parts by weight of a 10% aqueous solution of polyvinyl alcohol (Gosenol GH-17, trade name, a product of Nippon Synthetic Chemicals Co.) were added. The mixture was further stirred for 30 minutes to obtain a coating liquid having a weight ratio (P/B) of an amorphous alumina to a polymer of 7/1 and a solid content of 7.5% by weight.

Thereafter, a recording medium was obtained in the same manner as in Example 20. The physical properties were examined with the methods described above, and the obtained results are shown in Table 6.

Comparative Example 3

Recording medium was prepared in the same manner as Example 20, except that the alumina hydrate A in the example 20 was replaced by silica (Mizucasil P-78A, trade name, a product of Mizusawa Chemical Industries Co.). The physical properties were measured with the methods described above, and the obtained results are shown in Table 6.

TABLE 6

| Example | 28 | 29 | 30 | 31 | 32 | Comp. Ex. 1 | Comp. Ex. 2 | Comp. Ex. 3 |
|---|---|---|---|---|---|---|---|---|
| Alumina hydrate | D | D | D | D | D | Pseudo boehmite | Amorphous | Silica |
| Zirconium compound | ZN | ZN | ZN | ZN | ZN | — | ZC | ZC |
| $ZrO_2/Al_2O_3$ | $9.8 \times 10^{-3}$ | $9.8 \times 10^{-3}$ | $9.8 \times 10^{-3}$ | $9.8 \times 10^{-3}$ | $9.8 \times 10^{-3}$ | 0 | $1.6 \times 10^{-2}$ | $1.6 \times 10^{-2}$ |
| Organic acid | formic acid | formic acid | formic acid | lactic acid | oxalic acid | — | — | — |
| Organic acid/$ZrO_2$ | $1.7 \times 10^{-2}$ | $8.0 \times 10^{-4}$ | $7.5 \times 10^{-1}$ | $1.7 \times 10^{-2}$ | $1.7 \times 10^{-2}$ | 0 | 0 | 0 |
| BET specific surface area (m²/g) | 190 | 187 | 192 | 192 | 193 | 220 | 353 | 325 |
| Pore volume (cm³/g) | 0.71 | 0.72 | 0.70 | 0.72 | 0.71 | 0.59 | 0.05 | 0.85 |
| Degree of parallelizaion | 3.0 | 3.0 | 3.0 | 3.0 | 3.0 | 1.2 | — | — |
| Dispersion state | A | A | A | A | A | A | A | C |
| Initial viscosity (cP) | 105 | 112 | 132 | 115 | 113 | 185 | 540 | 620 |
| Binder shock | A | A | A | A | A | A | B | B |
| Pot life | 1.2 | 1.4 | 1.5 | 1.3 | 1.3 | 1.7 | gellation | gellation |
| pH | 4.25 | 4.30 | 4.11 | 4.26 | 4.19 | 6.31 | 2.37 | 3.54 |
| Total luminous transmittance (%) | 82.6 | 81.1 | 82.7 | 82.7 | 82.5 | 83 | 58.1 | 18.5 |
| Crack | A | A | A | A | A | C | C | C |
| Glossiness | 63.6 | 61 | 63.5 | 63.7 | 63.2 | 48 | 12 | 2 |
| Regular ink | | | | | | | | |
| Ink absorption | A | A | A | A | A | B | C | A |
| Optical density of image | 1.85 | 1.84 | 1.86 | 1.85 | 1.84 | 1.58 | 1.02 | 1.05 |
| Bleeding | A | A | A | A | A | C | C | B |
| Beading | A | A | A | A | A | B | C | A |
| Repelling | A | A | A | A | A | A | C | A |
| Dot gain | A | A | A | A | A | B | C | B |
| Migration | A | A | A | A | A | B | A | B |
| Halftone reproduction | A | A | A | A | A | A | C | C |
| Circularity | 0.92 | 0.89 | 0.92 | 0.92 | 0.91 | 0.85 | 0.75 | 0.87 |
| Curl after printing | A | A | A | A | A | B | C | C |
| Photo ink | | | | | | | | |
| Ink absorption | A | A | A | A | A | B | C | A |
| Optical density of image | 1.71 | 1.68 | 1.73 | 1.72 | 1.70 | 1.42 | 0.95 | 0.86 |
| Bleeding | A | A | A | A | A | C | C | B |
| Beading | A | A | A | A | A | C | C | A |
| Repelling | A | A | A | A | A | B | C | A |
| Dot gain | A | A | A | A | A | B | C | C |
| Migration | A | A | A | A | A | C | A | C |
| Halftone reproduction | A | A | A | A | A | C | C | C |
| Circularity | 0.92 | 0.89 | 0.91 | 0.91 | 0.91 | 0.84 | 0.75 | 0.81 |

The recording medium of the present invention has a wide range of from selection of inks, shows little migration or bleeding, also shows a high optical density at the printed areas and satisfactory glossiness and transparency, and is excellent in halftone reproduction particularly in the output of a photographic image. Also, the coating liquid of the present invention is excellent in the stability of dispersion, also is free from corrosion problem because of a high pH value and is capable of easily producing the recording medium without requiring any particular manufacturing facility.

Furthermore, the alumina dispersion of the present invention has excellent binding property and shaping property, also has a high solid content with a low viscosity, is excellent in stability of the dispersion and has a long pot life.

Also, the alumina dispersion of the present invention can be easily produced without requiring any particular manufacturing facility.

What is claimed is:

1. A recording medium provided with an ink receiving layer on a substrate, wherein said ink receiving layer comprises an alumina hydrate having a boehmite structure and a zirconium compound that provides a zirconium ion when an aqueous ink comprising an anionic dye is applied on the ink receiving layer, the zirconium ion making the ink receiving layer's ability to adsorb the anionic dye increase.

2. The recording medium according to claim 1, wherein said zirconium compound is an inorganic salt and/or an organic acid salt of zirconium.

3. The recording medium according to claim 1, wherein the ratio of a weight of said zirconium compound converted into $ZrO_2$ to a weight of said alumina hydrate converted into $Al_2O_3$ ($ZrO_2/Al_2O_3$) is within a range of from $1.0 \times 10^{-4}$ to $1.0 \times 10^{-1}$.

4. The recording medium according to claim 1, wherein said ink receiving layer further comprises one or more organic acids.

5. The recording medium according to claim 4, wherein said organic acid is contained within a range of from $5.0 \times 10^{-4}$ to 1.0 mol/g based on the weight of the zirconium compound converted into $ZrO_2$.

6. The recording medium according to claim 1, wherein said alumina hydrate has an average particle diameter or an average particle length within a range of from 1 to 50 nm.

7. The recording medium according to claim 1, wherein said alumina hydrate has an average aspect ratio within a range of from 3 to 10.

8. The recording medium according to claim 1, wherein said alumina hydrate has a crystallinity within a range of from 15 to 80.

9. The recording medium according to claim 1, wherein a degree of parallelization between microcrystals of said alumina hydrate and plane direction of the ink receiving layer is at not less than 1.5.

10. The recording medium according to claim 1, wherein said alumina hydrate has a BET specific surface area within a range of from 40 to 500 $m^2/g$.

11. The recording medium according to claim 1, wherein said alumina hydrate has a pore volume within a range of from 0.1 to 1.0 $cm^3/g$.

12. The recording medium according to claim 1, wherein said ink receiving layer further comprises a binder.

13. The recording medium according to claim 1, wherein a mixing ratio by weight of the alumina hydrate to a binder is within a range of from 1:1 to 30:1.

14. The recording medium according to claim 1, wherein a mixing ratio in weight of the alumina hydrate to a binder is within a range of from 3:1 to 20:1.

15. The recording medium according to claim 1, wherein said ink receiving layer has a BET specific surface area within a range of from 40 to 450 $m^2/g$.

16. The recording medium according to claim 1, wherein said ink receiving layer has a pore volume within a range of from 0.1 to 1.0 $cm^3/g$.

17. An image forming method by ejecting an ink from a minute orifice and depositing said ink on a recording medium, thereby forming a print, which comprises using the recording medium according to any one of claims 1 to 16.

18. The image forming method according to claim 17, wherein an ink droplet is ejected by applying thermal energy to the ink.

* * * * *

UNITED STATES PATENT AND TRADEMARK OFFICE
CERTIFICATE OF CORRECTION

PATENT NO. : 6,565,950 B1
DATED : May 20, 2003
INVENTOR(S) : Hiroshi Tomioka et al.

It is certified that error appears in the above-identified patent and that said Letters Patent is hereby corrected as shown below:

Column 1,
Line 17, "the" should be deleted.

Column 3,
Line 33, "the" should read -- a --.
Line 67, "medium." should read -- mediums. --.

Column 4,
Line 60, "can" should read -- can be --.

Column 5,
Line 21, "a" should be deleted.
Lines 23, 26 and 29, "terms" should read -- term --.
Line 28, "each other" should read -- with each other --.

Column 6,
Line 59, "the" should be deleted.

Column 7,
Line 66, "shows" should read -- show --.

Column 10,
Line 26, "temporarily" should read -- temporary --.
Line 51, "includes" should read -- include --.

Column 11,
Line 48, "internally" should read -- internal --.
Line 49, "tion" should read -- tion of --.

Column 12,
Line 37, "cause" should read -- caused --.

Column 13,
Line 27, "monochrometer," should read -- monochrometer); --.

Column 14,
Line 29, "coated" should read -- coated-layer --.

Column 15,
Line 27, "of in" should read -- of a --.
Line 61, "an" should be deleted.

UNITED STATES PATENT AND TRADEMARK OFFICE
CERTIFICATE OF CORRECTION

PATENT NO.    : 6,565,950 B1
DATED         : May 20, 2003
INVENTOR(S)   : Hiroshi Tomioka et al.

It is certified that error appears in the above-identified patent and that said Letters Patent is hereby corrected as shown below:

Column 17,
Line 7, "an" should be deleted.

Column 18,
Line 23, "an" should be deleted.

Column 23,
Lines 26 and 64, "part" should read -- parts --.

Column 24,
Line 45, "part" should read -- parts --.

Column 25,
Line 51, "from" should be deleted.
Line 57, "problem" should read -- problems --.

Signed and Sealed this

Fourth Day of November, 2003

JAMES E. ROGAN
*Director of the United States Patent and Trademark Office*